Sept. 26, 1933.    A. MOORE    1,928,597
COMBUSTION CHAMBER CONSTRUCTION
Filed Sept. 16, 1930
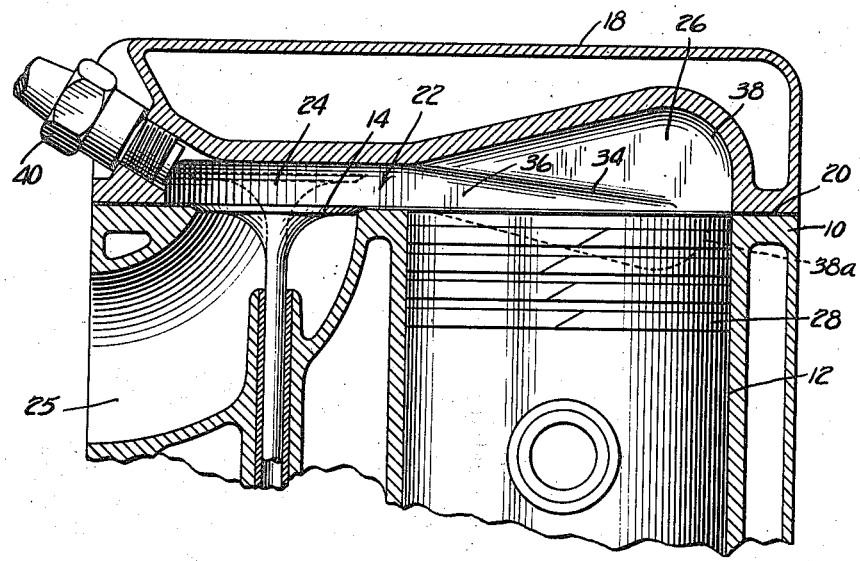
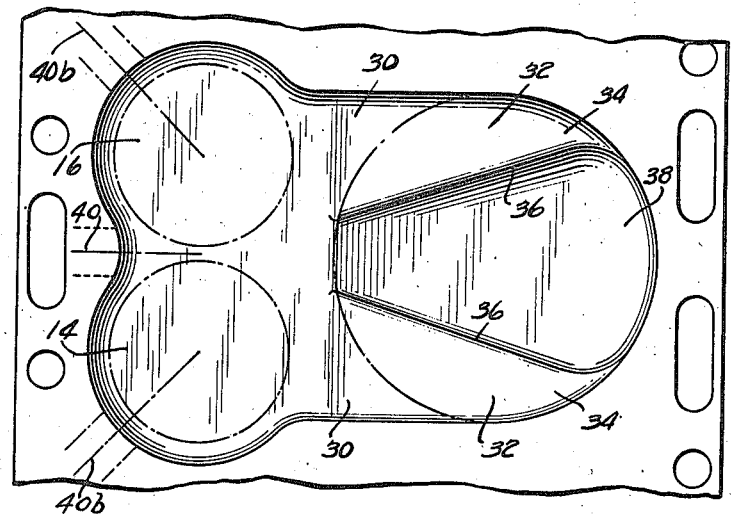
INVENTOR
*Arlington Moore*
BY
ATTORNEYS Patented Sept. 26, 1933

1,928,597

UNITED STATES PATENT OFFICE 1,928,597

COMBUSTION CHAMBER CONSTRUCTION

Arlington Moore, New York, N. Y., assignor, by mesne assignments, to Maxmoor Corporation, New York, N. Y., a corporation of Delaware Application September 16, 1930
Serial No. 482,200

12 Claims. (Cl. 123—191)

My invention relates to combustion chamber constructions for internal combustion engines, and particularly for L-head engines, and the same has for its object to provide a construction which reduces detonation or knocking by physically controlling the heat and flame propagation to prevent the development of auto-ignition temperatures and pressures.

Another object of the invention is to provide a construction of the character specified in which the combustion chamber is formed to maintain high velocity of flow of charge mixture entering the same past the intake valve for preventing cooling and the forming of a heterogeneous charge mixture.

Another object of the invention is to provide a structure of the character specified in which the combustion chamber space is distributed to maintain high velocity of flow of the charge mixture in one part thereof and to allow expansion of the flame wave in another part thereof to prevent or reduce detonation.

Another object of the invention is to provide a construction of the character specified in which the combustion chamber is reduced at the part thereof contiguous to the valves to maintain high rate of flow of the charge mixture therein, and enlarged contiguous to the piston for causing expansion of the flame wave propagated through the combustion chamber, and compensating for the reduction in volume of the first part to maintain a predetermined clearance volume.

Other objects will in part be obvious and in part be pointed out hereinafter.

In the accompanying drawing:

Figure 1 is a sectional elevation of one form of combustion chamber constructed according to and embodying my said invention; and Fig. 2 is an inverted plan of the cylinder head thereof.

Referring to the drawing, the cylinder block 10 is illustrated as of the standard L-head form, with the cylinder bore 12 and inlet valve 14 and exhaust valve 16 disposed laterally of the cylinder bore and arranged in a right line so as to be operated from the usual single cam shaft located low down in the engine, alongside the crank shaft and driven directly therefrom, one cylinder of the several usually employed being illustrated.

The hollow water containing cylinder head 18 is disposed upon the cylinder block with the usual gasket 20 therebetween, the cylinder head and cylinder block forming therebetween a combustion chamber 22 of predetermined compression ratio or clearance volume.

The portion 24 of the combustion chamber overlying the valves is of reduced uniform depth, preferably of a depth which is a minimum for allowing full opening movement of the valves, and the volume of such portion or part 24 is the minimum required to receive both valves and allow the opening thereof, the cross-sectional area thereof in the direction of charge flow approximately as far as practical the cross-sectional area of the conduit 25 supplying the charge mixture thereto.

The reduction in volume of the part 24 of the combustion chamber above the valves is compensated for to provide a predetermined clearance volume or compression ratio by enlarging the part 26 of the combustion chamber above the piston 28, the enlargement being provided either in the cylinder head, or piston, or both.

This enlargement in the cylinder head is accomplished by providing in the recess 30 of the cylinder head 18 spaced portions 32 having flat lower surfaces 34 which progressively decrease in height above the piston in the top dead center portion thereof from the valve side thereof towards the remote side thereof, and having flat vertical surfaces 36 facing each other and diverging in the same direction. The portions 32 at the junctures of the surfaces 34 and 36 are connected by a dome portion 38 of progressively increasing height above the piston from the valve side thereof towards the remote side thereof and of progressively increasing width in the same direction. If so desired, the enlargement of the part 26 of the combustion chamber may be accomplished by providing a recess 38$^a$ in the piston 28, said recess 38$^a$ being of progressively increasing depth and width from the valve side of the piston to the opposite side thereof. When the recess 38$^a$ is employed, the recess 30 in the cylinder head can be reduced in clearance volume. The compression ratio is preferably determined by the amount of clearance between the surfaces 34 and the piston without unduly reducing the clearance of the portions 38, 38$^a$ and thereby impairing the efficiency thereof in expanding the flame wave.

A spark plug or ignition means 40 is located in the lateral portion 24 of the combustion chamber at the side of the valves remote from the piston, or two spark plugs may be employed, as indicated at 40$^a$ and 40$^b$.

In operation, the charge mixture in a homogeneous state is admitted into the combustion chamber upon the intake stroke, and travels at high velocity through the relatively highly restricted portion 24 to the cylinder, thereby preventing undue expansion of the charge and cooling thereof liable to cause precipitation of fuel, forming a heterogeneous mixture more likely to cause detonation.

Upon ignition, the flame travels from the spark plugs at first through the restricted space 24 and then is progressively expanded in the space 26 above the piston for preventing or reducing detonation, the maintaining of homogeneity of charge mixture and the expansion of the flame wave cooperating in thus preventing or reducing detonation.

The combustion chamber part 28 continuously increases in cross-section rectilinearly towards the side of the piston remote from the valves, i. e., without abrupt changes, although constructions of step formation could be employed, if so desired, particularly in engines of lower compression ratio when compactness of space is of less moment. The flame wave propagated through part 24 and below surfaces 34 serving to restrict the clearance volume, progressively extends into the enlarged intermediate portion 38 above the piston, thereby preventing the formation of excess pressure waves.

In my invention, the space 24 between the valves and the cylinder head in which the flame waves are initially propagated, is confined in depth to that for proper valve opening irrespective of the total clearance volume (or compression ratio) of the combustion chamber, the remaining space necessary for obtaining a given clearance volume being formed above the piston. That is to say, for a given clearance volume, in the absence of the expansion spaces 38 or 38ª or both, the depth of the portion 24 would have to be greater. By my invention, therefore, the desired clearance volume is obtained while providing expansion space for reducing detonation.

The expansion chamber 38 extends substantially entirely across the piston from the valve side thereof to the opposite side thereof, the upper wall portion progressively and continuously increasing in height above the piston from the part 24 to the remote side of the piston, and the lower end of the inclined wall portion having a height substantially the same as the depth of the part 24. The incoming charge mixture therefore will sweep into all portions of the combustion chamber part 26 intermixing with any residue exhaust gas remaining in the combustion chamber at the end of the exhaust stroke, and upon the exhaust stroke the exhaust gases will be properly scavenged without a portion thereof being trapped in a pocket or recess incapable of being swept by the incoming charge mixture, and thereby preventing the intermixing of the charge with such entrapped residue gases.

It is a characteristic of my invention that while small clearance volumes or high compression ratios may be employed, nevertheless, with the small space available, detonation is effectively reduced by expansion of the flame front or fronts, and precipitation of fuel above the valves due to cooling resulting from charge expansion is prevented.

With the combustion chamber thus formed it is possible to operate engines on gasoline or fuels heavier than gasoline employing compression ratios higher than usual without causing detonation or the development of temperatures due to adiabatic compression liable to cause preignition and fuel cracking resulting in the formation of solid deposits. The use of specially prepared fuel, such as benzol blends, for preventing detonation is therefore rendered unnecessary.

Having thus described my invention, what I claim and desire to secure by Letters Patent is:

1. In an internal combustion engine, portions forming a combustion chamber of the L-head type, said combustion chamber including a part contiguous to the valves of uniform restricted depth, and a relatively enlarged part contiguous to the piston progressively increasing in cross-section away from the valves, and ignition means in the reduced part located to ignite the charge portion therein first.

2. In an internal combustion engine, portions forming a combustion chamber having a part of uniform depth contiguous to the valves and a relatively enlarged part beyond said first named part progressively increasing in cross-section in a direction away from the valves substantially to the remote side of the piston.

3. In an internal combustion engine, portions forming a combustion chamber of the L-head type having a reduced part contiguous to the valves, reduced outer parts over the piston decreasing in depth towards the side thereof remote from the valves, and an intermediate part over the piston increasing in depth and width towards the side thereof remote from the valves, and ignition means in the reduced part.

4. In an internal combustion engine, portions forming a combustion chamber of the L-head type having a portion over the valves and a portion over the piston progressively increasing in cross-section substantially to the side of the piston remote from the valves, and formed in part in the piston.

5. In an internal combustion engine, portions forming a combustion chamber of the L-head type, having a restricted portion over the valves and a portion extending over the piston and increasing in cross-section from the restricted portion substantially to the side of the piston remote from the valves.

6. In an internal combustion engine, portions forming a combustion chamber of the L-head type, have a restricted portion over the valves and a portion extending over the piston and increasing in cross-section from the restricted portion substantially to the side of the piston remote from the valves, and ignition means in said restricted portion.

7. In an internal combustion engine, portions forming a combustion chamber of the L-head type having a portion of substantially uniform cross-section over the valves, and a portion over the piston of progressively increasing cross-section extending substantially from the valve side of the piston to the opposite side thereof.

8. In an internal combustion engine, portions forming a combustion chamber of the L-head type having a portion of minimum clearance over the valves and a portion extending therefrom over the piston to the remote side thereof and continuously increasing in cross-section, and ignition means disposed in said portion of minimum clearance and located to ignite the charge therein first.

9. In an internal combustion engine, portions forming a combustion chamber of the L-head type, having a restricted portion at the valve side of the piston and a portion extending therefrom over the piston to the remote side thereof, said last named portion being formed partly in the piston and partly in the cylinder head and progressively increasing in cross-section to said remote side.

10. In an internal combustion engine, portions forming a combustion chamber of the L-head type having a restricted portion at the valve side of the piston and a portion of progressively increasing cross-section extending centrally over the piston from said restricted portion to the side of the piston remote from said restricted portion.

11. In an internal combustion engine, portions forming a combustion chamber of the L-head type having a restricted portion over the valves and a portion extending from an intermediate point of said restricted portion over the intermediate portion of the piston to the remote side thereof and progressively increasing in depth and width.

12. In an internal combustion engine, portions forming a combustion chamber of the L-head type having a restricted portion over the valves and an enlarged portion extending therefrom over the piston, to the side thereof remote from the valves and progressively increasing in cross-section, and ignition means in said restricted portion at the side of the valves remote from the piston.

ARLINGTON MOORE.